(12) United States Patent
Kim et al.

(10) Patent No.: US 7,180,836 B2
(45) Date of Patent: Feb. 20, 2007

(54) APPARATUS AND METHOD FOR AUTOMATICALLY ADJUSTING TILTING OF AN OPTICAL DISC DRIVE

(75) Inventors: Chung-ung Kim, Gyeonggi-do (KR);
Pil-je Cho, Gyeonggi-do (KR);
Kyu-hyeong Lee, Gyeonggi-do (KR);
Young-woo Huh, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 484 days.

(21) Appl. No.: 10/619,617

(22) Filed: Jul. 16, 2003

(65) Prior Publication Data
US 2004/0057352 A1    Mar. 25, 2004

(30) Foreign Application Priority Data
Sep. 24, 2002   (KR)   .................... 10-2002-0057810

(51) Int. Cl.
*G11B 7/00*    (2006.01)
(52) U.S. Cl. .................................. 369/44.32
(58) Field of Classification Search ...................... None
See application file for complete search history.

(56) References Cited
U.S. PATENT DOCUMENTS
6,862,257 B2 *   3/2005   Lin et al. ................. 369/53.28

FOREIGN PATENT DOCUMENTS
KR    1999-3365    1/1999

OTHER PUBLICATIONS
English Translation of Jung (KR 1999-003365), Jun. 2006.*

* cited by examiner

*Primary Examiner*—William Korzuch
*Assistant Examiner*—Joseph Haley
(74) *Attorney, Agent, or Firm*—Staas & Halsey LLP (57) ABSTRACT

An apparatus for automatically adjusting tilting of an optical disc drive, having placing parts, a plurality of height measurers, adjusters, a mirror disc, two mirror plates, an autocollimator, a photo detector, and a controller. The optical disc drive is placed on the placing parts. The plurality of height measurers measure heights of two portions of each of the pair of rails. The adjusters adjust the adjusting parts. The mirror disc is mounted on the turntable and spins. The two mirror plates are installed on the pair of rails. The autocollimator radiates parallel light beams onto the mirror disc and the two mirror plates. The photo detector detects focused points of the light beams reflected from the mirror disc and the two mirror plates and passing through the autocollimator. The controller calculates an amount of tilting from a distance between the focused points.

19 Claims, 8 Drawing Sheets

APPARATUS AND METHOD FOR AUTOMATICALLY ADJUSTING TILTING OF AN OPTICAL DISC DRIVE

CROSS-REFERENCE TO RELATED APPLICATIONS

This application claims the priority of Korean Patent Application No. 2002-57810, filed Sep. 24, 2002, in the Korean Intellectual Property Office, the disclosure of which is incorporated herein in its entirety by reference.

BACKGROUND OF THE INVENTION

1. Field of the Invention

The present invention relates to an apparatus and method for automatically adjusting tilting of an optical disc drive, and more particularly, to an apparatus and method for automatically adjusting tilting of an optical disc drive using an autocollimator.

2. Description of the Related Art

Optical disc drives generally write and read data on and from an optical disc using a beam emitted from an optical pickup unit, that slides in a radial direction of the optical disc.

Figure 1:
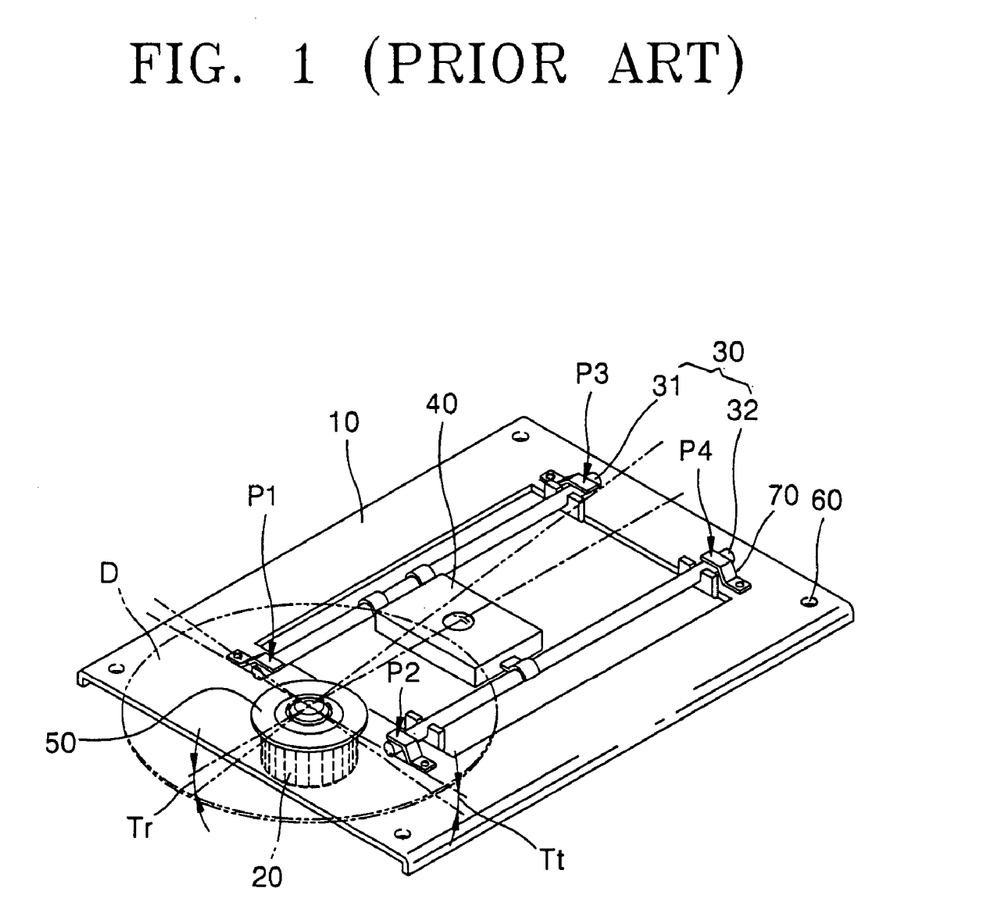
FIG. 1 is a perspective view of a general optical disc drive.

FIG. 1 is a perspective view of a general optical disc drive. Referring to FIG. 1, a spindle motor 20 and a pair of rails 30 are installed on a main base 10. An optical pickup unit 40 is installed to be capable of sliding along the rails 30.

The spindle motor 20 spins an optical disc D, and a turntable 50 on which the optical disc D is placed is combined with a shaft of the spindle motor 20. The optical pickup unit 40 writes and reads data on and from a recording surface of the optical disc D, and slides along the rails 30 in a radial direction of the optical disc D.

To accurately read and write data on and from the recording surface of the optical disc D, the recording surface of the optical disc D has to be at a predetermined angle with respect to an optical axis of a beam emitted from the optical pickup unit 40. To accomplish this, the surface of the turntable 50 has to be parallel with the rails 30 that guide the sliding of the optical pickup unit 40.

In general, the surface of the turntable 50 fails to be parallel with the rails 30 due to errors in manufacturing parts of the spindle motor 20 and the rails 30, and errors occurring when assembling the parts. Thus, deviation of an angle formed by the optical axis of the beam emitted from the optical pickup unit 40 and the recording surface of the optical disc D, from a predetermined angle, is called tilting. Tilting has two components: radial tilting, Tr, that refers to the slope in a direction where the optical pickup unit 40 slides along the surface of the optical disc D, i.e., in the radial direction of the optical disc D; and tangential tilting, Tt, that refers to the slope in a direction perpendicular to the radial direction.

Referring to FIG. 1, a tilting adjusting method includes adjusting the slope of the spindle motor 20 and adjusting the slope of the rails 30. Methods of adjusting the slope of the rails 30 are classified into a two-point adjusting method, by which two parts, P3 and P4, around the outer circumference of the optical disc D are adjusted, and a three-point adjusting method, by which two parts P3 and P4, and part P2 are adjusted. If the three-point adjusting method is used, P1 is a fixed part. Since the two-point adjusting method degrades the accuracy of adjusting tangential tilting, the three-point adjusting method is primarily used.

A process of adjusting tilting using the three-point adjusting method will be described. First, a degree of parallelism between the turntable 50 and the rails 30 is measured using optical equipment to calculate the amount of tilting. Next, a worker adjusts the rails 30 at the three adjusting parts P2, P3, and P4, according to the amount of tilting. Here, the worker repeats the adjusting until the amount of tilting is within a predetermined permitted limit.

When manufacturing optical disc drives, a process of adjusting tilting is generally performed. In a case where errors occur frequently when adjusting tilting, it takes a considerable amount of time to adjust tilting. Thus, the efficiency of production of optical disc drives decreases. Also, since a worker adjusts the rails to adjust tilting, when an unskilled worker adjusts tilting, the uniformity of adjusting tilting generally decreases, and a significant amount of time is required for adjusting tilting.

SUMMARY OF THE INVENTION

Accordingly, the present invention provides an apparatus and method for automatically adjusting tilting of an optical disc drive by detecting the amount of tilting using an autocollimator and automatically adjusting tilting according to the amount of tilting.

According to an aspect of the present invention, there is provided an apparatus for automatically adjusting tilting between an optical pickup unit of an optical disc drive, sliding along a pair of rails supported by three adjusting parts and one fixed part, and a turntable on which an optical disc is placed. The apparatus has placing parts, a plurality of height measurers, adjusters, a mirror disc, two mirror plates, an autocollimator, a photo detector, and a controller. The optical disc drive is placed on the placing parts. The plurality of height measurers measure heights of two portions of each of the pair of rails. The adjusters adjust the adjusting parts. The mirror disc is mounted on the turntable and spins. The two mirror plates are installed on the pair of rails. The autocollimator radiates parallel light beams onto the mirror disc and the two mirror plates. The photo detector detects focused points of the light beams reflected from the mirror disc and the two mirror plates and passing through the autocollimator. The controller calculates an amount of tilting from a distance between the focused points.

According to another aspect of the present invention, there is provided a method of automatically adjusting tilting of an optical disc drive in which tilting is measured between an optical pickup unit sliding along a pair of rails supported by three adjusting parts and one fixed part, and a turntable on which the optical disc drive is placed. A pair of rails are adjusted to be parallel. Parallel light beams are radiated, using an autocollimator, onto a mirror disc that is mounted on the turntable and spins, and two mirror plates, that are installed on the pair of rails. An amount of tilting is calculated from focused points of light beams reflected from the mirror disc and the mirror plates and passing through the autocollimator. The adjusting parts are raised according to the amount of tilting.

According to another aspect, after adjusting the adjusting parts, the amount of tilting is re-calculated from the focused points of light beams reflected from the mirror disc and the mirror plates and passing through the autocollimator, to check whether the amount of tilting is within a predetermined permitted limit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other objects and advantages of the invention will become apparent and more readily appreciated from the following description of the embodiments taken in conjunction with the accompanying drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
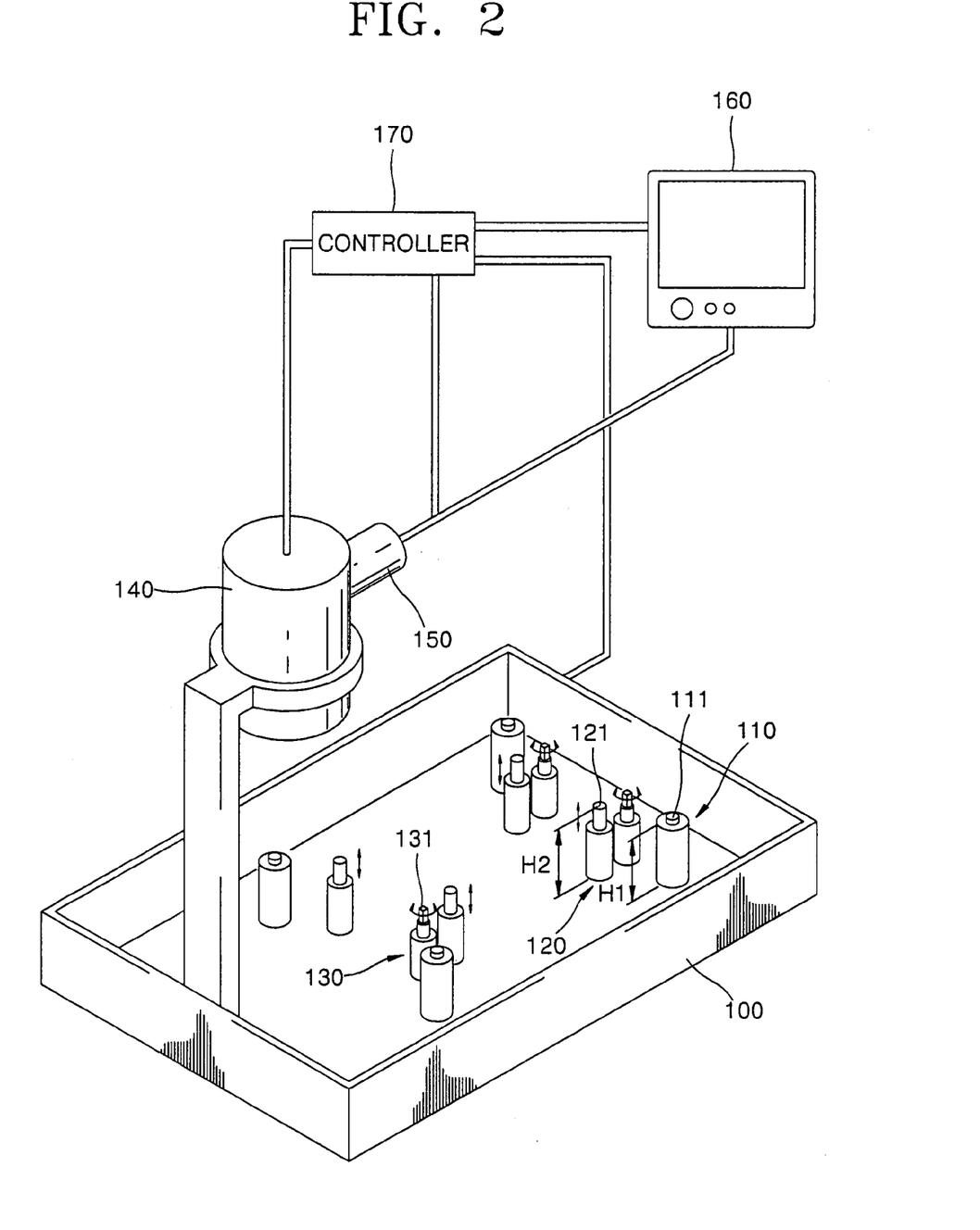
FIG. 2 is a perspective view of an apparatus for automatically adjusting tilting of an optical disc drive.
Figure 3:
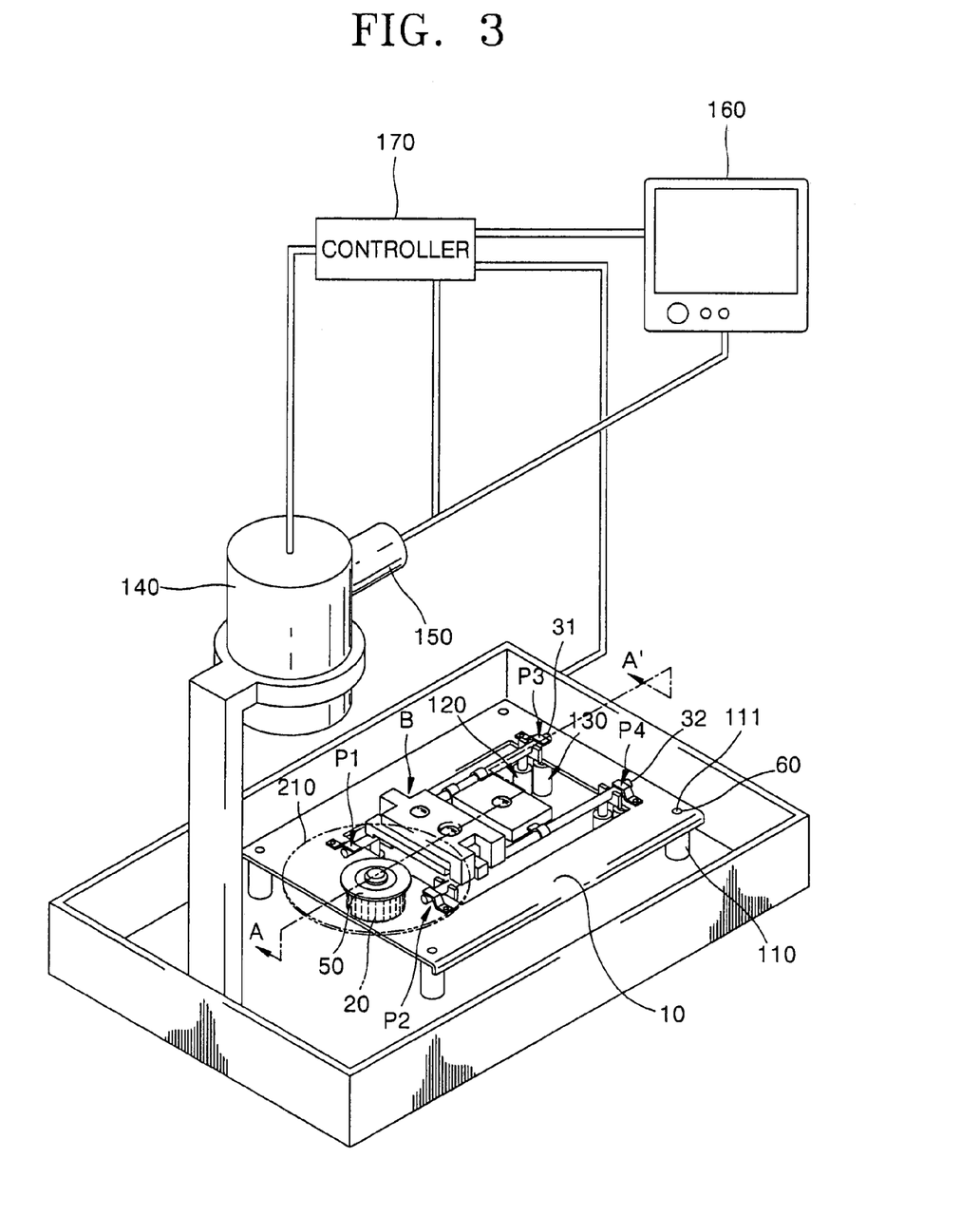
FIG. 3 is a perspective view of the apparatus of FIG. 2, in which an optical disc drive is mounted.

FIG. 2 is a perspective view of an apparatus for automatically adjusting tilting of an optical disc drive according to an embodiment of the present invention, and FIG. 3 is a perspective view of the apparatus of FIG. 2, in which an optical disc drive is mounted.

Referring to FIG. 2, placing parts 110, height measurers 120, adjusters 130, and an autocollimator 140 are installed on a base 100. A camera 150 is installed in the autocollimator 140 and connected to a controller 170 and a monitor 160.

An optical disc drive is placed on the placing parts 110 to adjust tilting. As shown in FIG. 3, basic bosses 111, which protrude from the placing parts 110, are inserted into basic holes 60 formed in a main base 10. Heights Hi of the placing parts 110 are the same.

Figure 4:
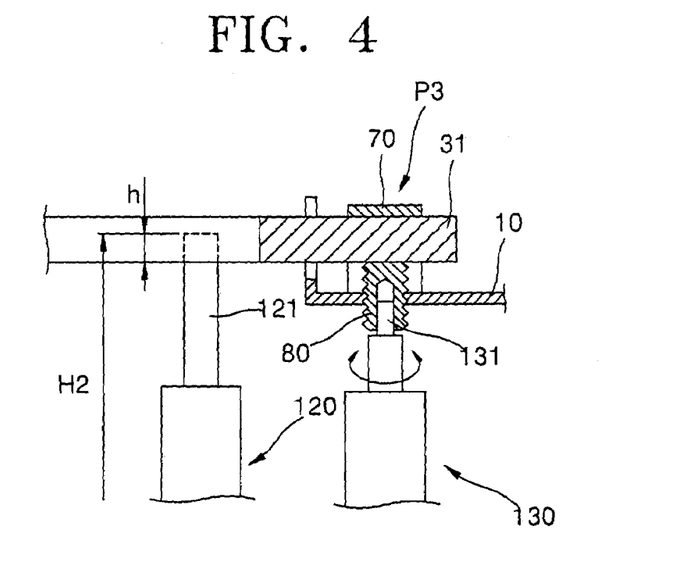
FIG. 4 is a cross-sectional view taken along line A–A' of FIG. 3.

The height measurers 120 include probes 121 that contact bottom portions of rails 31 and 32 and the height of the height adjusters 120 adjusts according to the height of rails 31 and 32. To check whether the rails 31 and 32 are parallel, heights of at least two portions of each of the rails 31 and 32 are measured. Thus, there must be at least four height measurers 120. Heights H2 of the probes 121 are the same when the optical disc drive is not mounted. As shown in FIG. 4, the probes 121 are installed slightly higher than the height where the rails 31 and 32 are to be installed. It is preferable that the height measurers 120 are installed so that the probes 121 contact portions of the rails 31 and 32 close to the fixed part P1, and adjusting parts P3, P2, and P4, which are respectively located at ends of the rails 31 and 32. The probes 121 are adjusted to contact the rails 31 and 32. The amount of adjustment of the probes 121 is transmitted to the controller 170 to check whether the rails 31 and 32 are parallel, and if the rails 31 and 32 are not parallel, to calculate the necessary amount of adjustment of the adjusting parts P2, P3, and P4.

The adjusters 130 adjust the adjusting parts P2, P3, and P4 of the rails 31 and 32. Adjusting drivers 131, which are installed on ends of the adjusting parts 130, engage setscrews 80 (see FIG. 4) installed beneath the adjusting parts P2, P3, and P4 when the optical disc drive is placed on the placing parts 110. As shown in FIG. 4, a spring 70, which is opposite to the setscrew 80, presses the rail 31 toward the setscrew 80. Thus, since the setscrew 80 is rotated by turning the adjusting driver 131, the rail 31 ascends and descends according to the amount of rotation of the setscrew 80. The adjusting parts P2 and P4 are the same as described above. The controller 170 controls the adjusters 130.

Figure 5:
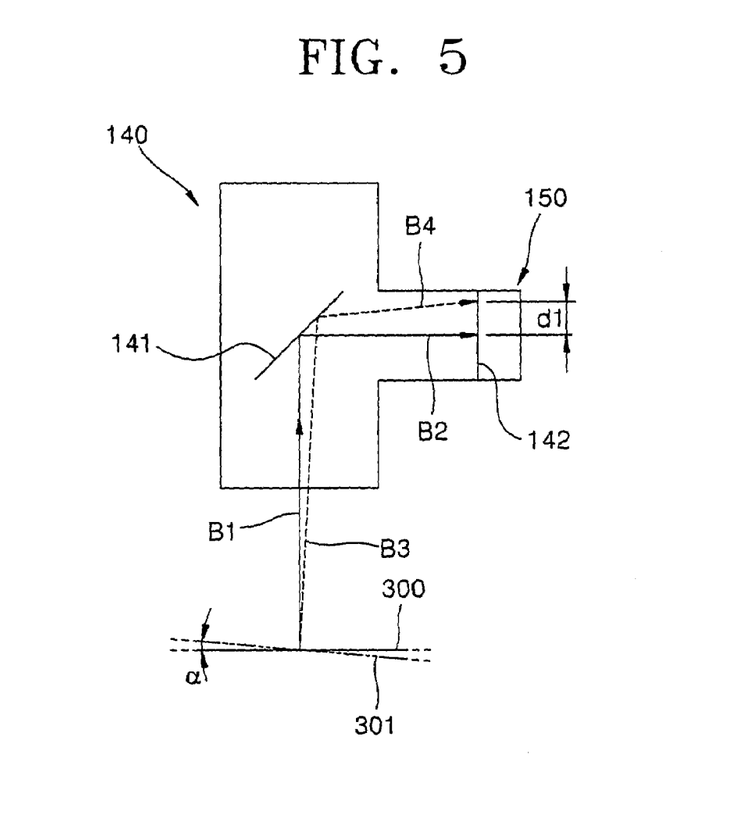
FIG. 5 is a cross-sectional view of an autocollimator.

The autocollimator 140 radiates a parallel light beam onto an object via an objective lens, and focuses the beam reflected from the object onto a focusing surface. FIG. 5 illustrates optical paths along which light beams emitted from the autocollimator 140 reflect from reflective surfaces 300 and 301 back into the autocollimator 140, reflect on a reflecting mirror 141, and focus onto a focusing surface 142. A light beam incident on the reflective surface 300, which is perpendicular to an incident light beam B1, is focused onto the focusing surface 142 through an optical path of B1-B1-B2. A light beam incident on the reflective surface 301, which is at an angle of a with the reflective surface 300, is focused onto the focusing surface 142 through an optical path of B1-B3-B4. Here, a distance d1 between two focused points is proportional to the angle a between the reflective surfaces 300 and 301. If the reflective surfaces 300 and 301 are parallel, light beams are focused at the same point, and d1 becomes zero.

According to one aspect, the camera 150 is a photo detector that detects a focused point formed on the autocollimator 140 and photographs the focusing surface 142 to detect a focused point. An image on the focusing surface 142 photographed by the camera 150 is displayed on the monitor 160.

To measure tilting of the turntable 50 and the rails 30 using the autocollimator 140, reflectors are installed on the turntable 50 and the rails 30.

Figure 6:
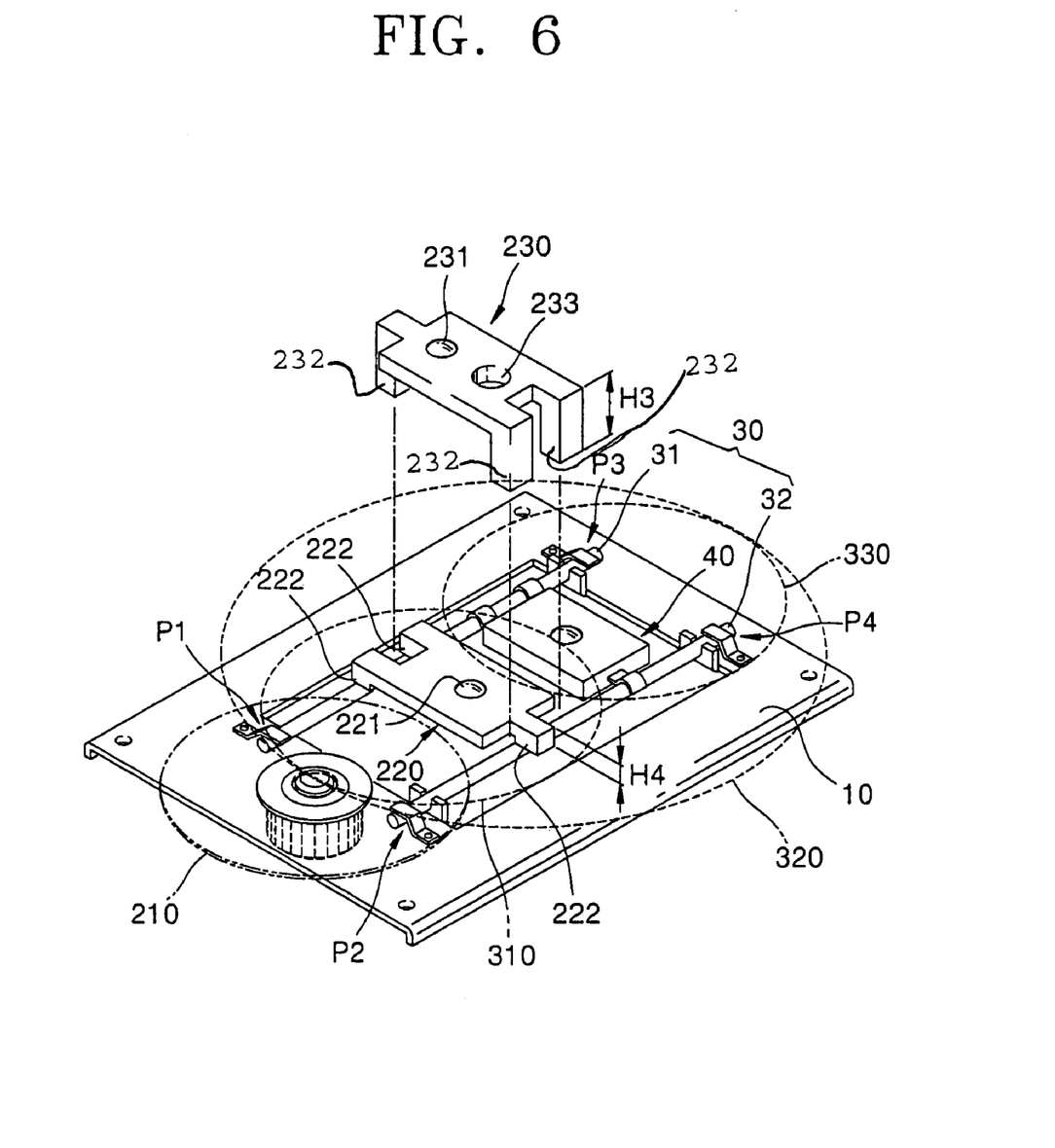
FIG. 6 is an exploded perspective view of portion B of FIG. 3.

FIG. 6 is an exploded perspective view of portion B of FIG. 3. Referring to FIG. 6, a mirror disc 210 is installed as a reflector on the turntable 50 and mirror plates (not shown) are installed as reflectors on the rails 30. The mirror disc 210 is spun by the spindle motor 120, and reflects a light beam emitted from the autocollimator 140, to measure a slope of the turntable 50.

The mirror plates are placed on the rails 31 and 32 and need to be two to measure the slopes of the rails 31 and 32. When two mirror plates are respectively installed toward inner and outer circumferences of an optical disc, an autocollimator having the effective area that is denoted by reference numeral 320 is used, or autocollimators having the effective areas that are denoted by reference numerals 310 and 330 are used. But when two mirror plates are installed toward the inner circumference of the optical disc, only the autocollimator having the effective area that is denoted by reference numeral 310 is used. As shown in FIG. 6, a first mirror plate 220 and a second mirror plate 230 are installed at a predetermined distance from each other. The first plate 220 includes first supports 222, that are supported on two portions of the rail 31 and on one portion of the rail 32, and a first reflective surface 221 that reflects light. The second mirror plate 230 includes second supports 232 that are supported on one portion of the rail 31 and on two portions of the rail 32, a second reflective surface 231 that reflects light, and a connection hole 233 through which light is transmitted to the first reflective surface 221. Heights H3 of the second supports 232 are determined in consideration of heights H4 of the first supports 222, so that the first mirror plate 220 does not interfere with the second mirror plate 230.

Figure 7:
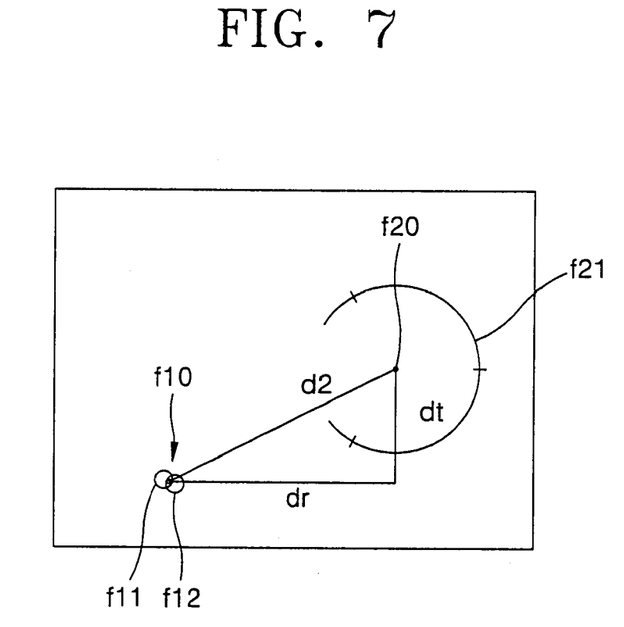
FIG. 7 is a view showing a first focused point and a second focused point displayed on a screen of a monitor before adjusting tilting.
Figure 8:
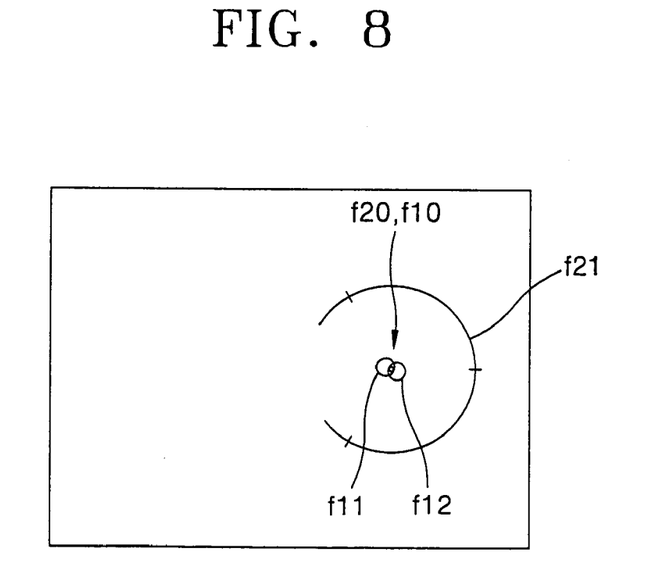
FIG. 8 is a view showing a first focused point and a second focused point displayed on a screen of a monitor after adjusting tilting.
Figure 9A:
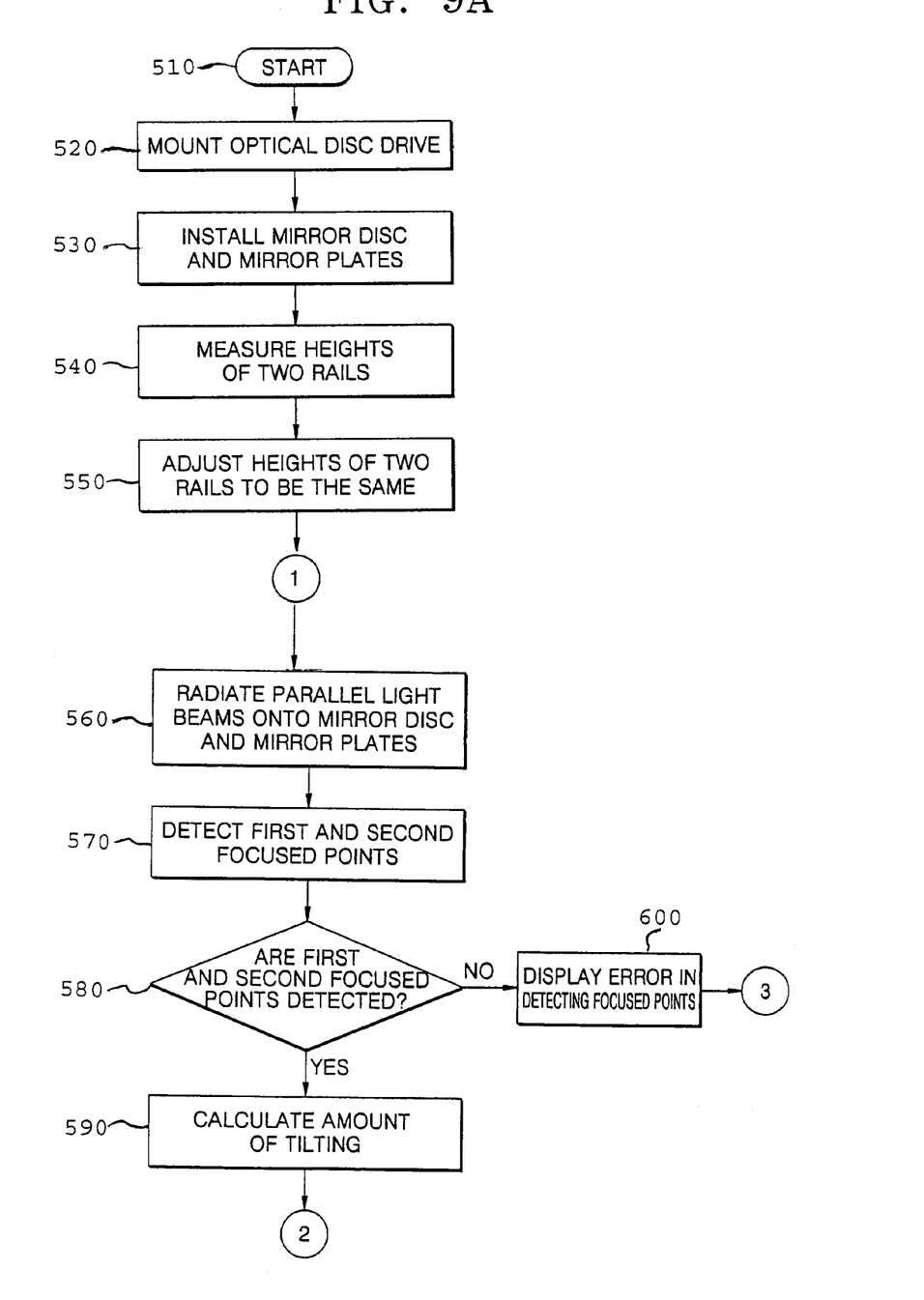
FIGS. 9A and 9B are flowcharts for explaining a method of automatically adjusting tilting of an optical disc drive.
Figure 9B:
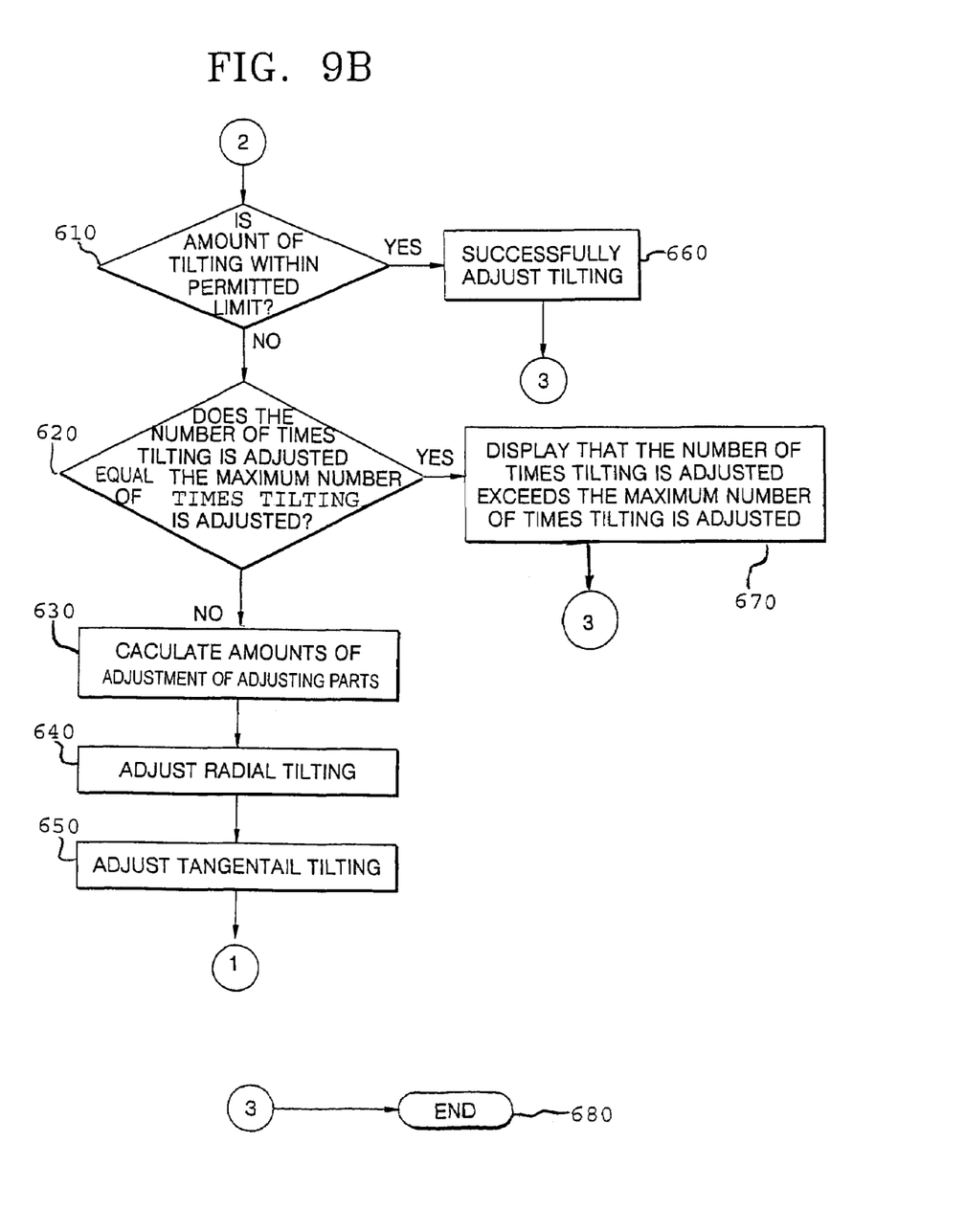

FIGS. 7 and 8 respectively illustrate first and second focused points, before and after adjusting tilting, displayed on a screen of a monitor, and FIGS. 9A and 9B are flowcharts for explaining a method of automatically adjusting tilting of an optical disc drive.

A method of adjusting tilting will now be described with reference to FIGS. 1 through FIG. 9B.

At the start of the method (operation 510), an optical disc drive is placed on the placing parts 110 (operation 520). Thereafter, as shown in FIGS. 3, 5, and 6, the mirror disc 210 is mounted on the turntable 50, and the first and second plates 220 and 230 are placed on the rails 31 and 32 (operation 530). The first and second mirror plates 220 and 230 are installed toward the inner circumference of the optical disc. Then, upper ends of the probes 121 contact the bottom portions of the rails 31 and 32. As previously described, the initial heights H2 of the probes 121 are higher than the rails 31 and 32. Thus, as shown in FIG. 4, the heights H2 of the probes 121 contacting the bottom portions of the rails 31 and 32 vary by reference character h from the initial heights H2. Information on the variation h is transmitted to the controller 170 (operation 540). In other words, since two probes 121 contact each of the rails 31 and 32, in operation 540, data on height changes of four probes are transmitted to the controller 170. In operation 550, the controller 170 rotates the adjusting drivers 131 installed on the adjusters 130 to adjust the amount of rotation of the setscrews 80, and thereby adjusts the adjusting points P2, P3, and P4. In operations 520–550, if the heights of the four probes vary equally (h is the same for all four probes), the heights H1 of the placing parts 110 are the same, and the initial heights H2 of the probes 121 are the same, then the rails 31 and 32 are parallel.

According to one aspect, the mirror disc 210 and the first and second mirror plates 220 and 230 are installed after the rails 31 and 32 are adjusted to be parallel. But since the state of the mounted optical disc drive may vary, as described above, it is preferable that the mirror disc 210 and the first and second mirror plates 220 and 230 are preinstalled, to maintain uniformity of adjusting work.

In operation 560, the autocollimator 140 radiates parallel light beams onto the mirror disc 210 and the first and second mirror plates 220 and 230. According to one aspect, the mirror disc 210 is spun when operations 520–550 start. According to another aspect, the disc 210 is spun after the operations 520–550 are complete.

The parallel light beams emitted from the autocollimator 140 and reflected from the mirror disc 210 and the first and second mirror plates 220 and 230 are focused on positions of the focusing surface 142 according to the amount of tilting of the turntable 50 and the rails 31 and 32. In FIG. 7, the focusing surface 142 is photographed by the camera 150 and displayed on the monitor 160. A focused point f21 is formed by reflection from the mirror disc 210, and focused points f11 and f12 are respectively formed by reflections from the first and second mirror plates 220 and 230. Since the rails 31 and 32 have been already adjusted to be parallel to within a predetermined tolerance, the focused points f11 and f12 formed by reflections from the first and second mirror plates 220 and 232 almost overlap. If the rails 31 and 32 are not parallel, the focused points f11 and f12 may become distant from each other. If the rails 31 and 32 are accurately adjusted to be parallel, the focused points f11 and f12 may completely overlap, and thus one focused point may be seen.

The focused point f21 formed by reflection from the mirror disc 210 is almost circular. If the mirror disc 210 is completely flat, the focused point f21 is focused as one point like the focused points f11 and f12. But the mirror disc 210 is generally not completely flat, and wobbles slightly. Thus, if a light beam is radiated onto the mirror disc 210 that is spinning, a focused point is focused to be nearly circular like the focused point f21 shown in FIG. 7. The focused point f21 shown in FIG. 7 is not a completely closed circle. But the focused point f21 may be completely closed circle depending on the spin speed of the mirror disc 210 and the shutter speed of the camera 150.

The controller 170 calculates coordinates of first and second focused points f10 and f20 and calculates the amount of tilting from the coordinates. According to one aspect, the coordinates are calculated from a focused point on a charge coupled device (CCD; not shown) built in the camera 150 or from a focused point on a screen of the monitor 160. In the present embodiment, however, the coordinates are calculated from the focused point on the screen of the monitor 160.

As described above, since the rails 31 and 32 have already been adjusted to be parallel, the focused points f11 and f12 nearly overlap. In operation 570, as shown in FIG. 7, the controller 170 recognizes a central point where the focused points f11 and f12 overlap as the first focused point f10, and calculates coordinates of the first focused point f10. The focused point f21 is almost circular as previously described. Also in operation 570, the controller 170 places three points on the circumference of the focused point f21, recognizes a central point as the second focused point f20, and calculates coordinates of the second focused point f20.

In FIG. 5, if optical paths B1-B1-B2 and B1-B3-B4 are identified, the relationship between the slope angle a and the focusing distance d1 can be identified. According to one aspect, if the size of the CCD (not shown) built in the camera 150 is identified, the relationship between the distance between first and second focused points on the CCD and the slope angle a can be identified. Moreover, according to another aspect, if the size of the screen of the monitor 160 is identified, the relationship between a distance d2 between the first and second focused points on the screen of the monitor 160, and the slope angle a can be identified. As noted previously, the slope angle a is the amount of tilting between the turntable 50 and the rails 31 and 32.

According to one aspect, if the first focused point f10 or the second focused point f20 cannot be detected, in operation 580, then in operation 600, the controller 170 displays an error via the screen of the monitor 160, and stops the operations (operation 680). According to another aspect, if the first focused point f10 or the second focused point f20 cannot be detected, in operation 580, then in operation 600, the controller 170 displays an error via a warning sound and stops the operations (operation 680). According to yet another aspect, if the first focused point f10 or the second focused point f20 cannot be detected, in operation 580, then in operation 600, the controller 170 displays an error via the screen of the monitor 160 and a warning sound, and stops the operations (operation 680). According to one aspect, if the mirror disc 210 and the first and second mirror plates 220 and 230 are not installed, this phenomenon also occurs.

The following is an example describing the relationship between a slope angle of a reflective surface and the distance between the focused points on the screen of the monitor 160. According to one aspect, the lengths of the optical paths B1-B1-B2 and B1-B3-B4, and the size of the screen of the monitor 160 are sized so that when the slope angle α is 0.005, the distance between the first and second focused points on the screen of the monitor 160 is 1 mm. Then, as shown in FIG. 7, in operation 590, a tangential tilting amount Tt and a radial tilting amount Tr become Tt=0.005×dt and Tr=0.005×dr.

In operation 610, the controller 170 determines whether the amount of tilting calculated in operation 590 is within a predetermined permitted limit. If so, then the controller 170 determines that the tilting is successfully adjusted (operation 660), and ends the operations (operation 680). If the controller 170 determines that the amount of tilting calculated in operation 590 is not within the predetermined permitted limit, then in operation 620, the controller 170 determines whether the tilting has been adjusted a predetermined maximum number of times.

In operation 620, if the controller 170 determines that the tilting has been adjusted a predetermined maximum number of times, then according to one aspect, in operation 670, the controller 170 displays that message via the screen of the monitor 160 and ends the operations (operation 680). According to another aspect, in operation 670, the controller 170 creates a warning sound and stops the operations (operation 680). According to yet another aspect, the controller 170 displays that message via the screen of the monitor 160 and creates a warning sound, and stops the operations (operation 680).

In operation 620, if the controller 170 determines that the tilting has not been adjusted a predetermined maximum number of times, then the controller proceeds to adjust the tilting.

As described above, after the tangential tilting amount Tt and the radial tilting amount Tr are calculated in operation 590, the amounts of necessary adjustment of the adjusting parts P2, P3, and P4, are calculated from the tangential tilting amount Tt and the radial tilting amount Tr in operations 630–650. Additionally the setscrews 80 are adjusted using the adjusters 130, so that the tangential tilting amount Tt and the radial tilting amount Tr are within a predetermined permitted limit.

More specifically, in operation 630, the amounts of necessary adjustment of the adjusting parts P2, P3, and P4 are calculated. For example, if a distance between the fixing part P1 and the adjusting part P3 of the rail 31 is assumed as d3, the amount of adjustment of the adjusting part P3 for adjusting the radial tilting amount Tr, is d3×SIN(0.005×dr). Also, if a distance between the rails 31 and 32 is assumed as d4, the amount of adjustment of the adjusting parts P2 and P4 for adjusting the tangential tilting amount Tt, is d4×SIN(0.005×dt).

After calculating the amounts of necessary adjustment of the adjusting parts P2, P3, and P4, the adjusters 130 operate so that the adjusting parts P2, P3, and P4 are adjusted by the respective calculated amounts. The controller 170 calculates the amounts of rotation of the setscrews 80 necessary for adjusting the adjusting parts P2, P3, and P4 from the amounts of necessary adjustment of the adjusting parts P2, P3, and P4, and the pitch of the setscrews 80. The controller 170 then turns the adjusting drivers 131, which engage the setscrews 80, by the calculated rotation amounts of the setscrews 80.

According to one aspect, the radial tilting amount, Tr, is adjusted, and then the tangential tilting amount, Tt, is adjusted. According to another aspect, this order is reversed. The adjusting parts P3 and P4 adjust to change the radial tilting amount, Tr, Since the optical pickup unit 40 is supported on two portions of the rail 31, as shown in FIGS. 1 and 6, although only the adjusting part P2 is adjusted, the radial tilting amount, Tr, is adjusted. But then the rails 31 and 32 are not parallel. Thus, the adjusting parts P3 and P4 have to be adjusted by the same amount as adjusting part P2. Thereby, in operation 640, the rails 31 and 32 are kept parallel, and the adjustment of tilting in the radial direction is completed.

Thereafter, the adjusting parts P2 and P4 of the rail 32 are adjusted by the same amount to adjust the tangential tilting amount, Tt. Thus, in operation 650, the rails 31 and 32 are kept parallel, and the adjustment of tilting in the tangential direction is completed. As described above, after the adjustment of tilting is completed, as shown in FIG. 8, a portion of the first focused point f10 overlaps a portion of the second focused point f20 on the screen of the monitor 160.

After operations 630–650 are performed, the controller 170 checks the adjustments that were made by performing operations 560–620 again. This cycle continues until either the amount of tilting is within the predetermined permitted limit, or until the tilting is adjusted the predetermined maximum number of times.

As described above, using an apparatus and method for automatically adjusting tilting of an optical disc drive according to the present invention, the following effects can be achieved.

Since two mirror plates are installed toward the inner circumference of the optical disc, rather than toward the inner and outer circumferences of the optical disc, a less expensive autocollimator with a smaller effective area can be used.

Also, unlike a conventional tilting adjusting method, which depends on the skill of a worker, the amount of tilting can be automatically measured, and tilting can be automatically adjusted. Thus, tilting can be adjusted more uniformly and more precisely.

Moreover, since a process of adjusting tilting can be automated, efficiency of the process of manufacturing optical disc drives can be improved, and costs for manufacturing the optical disc drives can be reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for automatically adjusting tilting between an optical pickup unit of an optical disc drive, sliding along a pair of rails supported by three adjusting parts and one fixed part, and a turntable on which an optical disc is placed, the apparatus comprising:
 a base;
 placing parts connected to the base, on which the optical disc drive is placed;
 a plurality of height measurers that measure heights of two portions of each of the pair of rails relative to the base;

adjusters that adjust the adjusting parts;
a mirror disc mounted on the turntable and spins;
two mirror plates installed on the pair of rails;
an autocollimator that radiates parallel light beams onto the mirror disc and the two mirror plates;
a photo detector that detects focused points of the light beams reflected from the mirror disc and the two mirror plates and passing through the autocollimator; and
a controller that calculates an amount of tilting from a distance between the focused points.

2. The apparatus of claim 1, wherein the two mirror plates are spaced apart from each other in a first direction that is approximately perpendicular to the pair of rails.

3. The apparatus of claim 2, wherein the two mirror plates comprise:
a first mirror plate that has
a first reflective surface, and
first supports supported on the pair of rails; and
a second mirror plate that is installed over the first mirror plate and has
a second reflective surface,
second supports supported on the pair of rails, and
a connection hole through which the light beams are transmitted to the first reflective surface.

4. The apparatus of claim 2, wherein the two mirror plates comprise:
a first mirror plate that has
a first reflective surface, and
first supports supported on two portions of one of the pair of rails and on a portion of the other of the pair of rails; and
a second mirror plate that is installed over the first mirror plate and has
a second reflective surface,
second supports supported on a portion of the one of the pair of rails and on two portions of the other of the pair of rails, and
a connection hole through which the light beams are transmitted to the first reflective surface.

5. The apparatus of claim 1, wherein:
the controller determines a central point between the focused points of light beams reflected from the two mirror plates as a first focused point;
the controller determines a central point of an approximately circular area of the focused point of light reflected from the mirror disc as a second focused point; and
the controller calculates the amount of tilting from a distance between the first and second focused points.

6. The apparatus of claim 5, wherein:
the controller places three points on a perimeter of the approximately circular area and determines a central point of the three points as the second focused point.

7. The apparatus of claim 1, further comprising:
a monitor that displays the focused points detected by the photo detector.

8. The apparatus of claim 1, wherein:
the height measurers are installed adjacent to the fixed part and the adjusting parts.

9. A method of automatically adjusting tilting of an optical disc drive in which tilting is measured between an optical pickup unit sliding along a pair of rails supported by three adjusting parts and one fixed part, and a turntable on which the optical disc drive is placed, the method comprising:
adjusting the pair of rails to be parallel;
radiating a plurality of parallel light beams, using an autocollimator, onto
a mirror disc that is mounted on the turntable and spins, and
two mirror plates that are installed on the pair of rails;
calculating an amount of tilting from focused points of light beams reflected from the mirror disc and the mirror plates and passing through the autocollimator; and
adjusting the adjusting parts according to the amount of tilting.

10. The method of claim 9, further comprising calculating an amount of tilting from focused points of light beams reflected from the mirror disc and two mirror plates again after adjusting the adjusting parts, to check whether the amount of tilting is within a predetermined permitted limit.

11. The method of claim 10, wherein if the amount of tilting is not within the predetermined permitted limit, the adjusting the adjusting parts is performed again.

12. The method of claim 11, wherein if the number of times the adjusting the adjusting parts is performed equals a predetermined maximum number of times tilting is adjusted, adjusting tilting stops.

13. The method of claim 9, wherein the adjusting the pair of rails to be parallel comprises:
placing the optical disc drive on placing parts;
measuring heights of at least two portions of each of the pair of rails; and
adjusting the adjusting parts so that heights of the pair of rails are the same.

14. The method of claim 9, wherein the calculating the amount of tilting from focused points of light beams reflected from the mirror disc and the mirror plates and passing through the autocollimator comprises:
detecting a first focused point formed by reflection from the two mirror plates and a second focused point formed by reflection from the mirror disc; and
calculating the amount of tilting from a distance between the first focused point and the second focused point.

15. The method of claim 14, wherein the calculating the amount of tilting from focused points of light beams reflected from the mirror disc and the mirror plates and passing through the autocollimator further comprises:
stopping adjusting tilting if the first and second focused points are not detected.

16. The method of claim 14, wherein the detecting the first focused point formed by reflection from the two mirror plates comprises:
determining a central point on a line connecting two focused points formed by reflection from the first and second mirror plates.

17. The method of claim 14, wherein the detecting the second focused point formed by reflection from the mirror disc comprises:
determining a central point of an approximately circular area formed by reflection from the mirror disc.

18. The method of claim 9, wherein the adjusting the adjusting parts according to the amount of tilting comprises:
calculating amounts of necessary adjustment of the adjusting parts from the amount of tilting;
adjusting the three adjusting parts to adjust tilting in the radial direction; and
adjusting two of the three adjusting parts of one of the pair of rails that is supported by the two adjusting parts, to adjust tilting in a tangential direction.

19. An apparatus for adjusting tilting of an optical disc in which tilting is measured between an optical pickup unit that slides along a pair of rails that are supported by three adjusting parts and one fixed part, and a turntable on which an optical disc is placed, the apparatus comprising:
- a base with placing parts, on which the optical disk is placed;
- at least one height measurer that measures the heights of at least two portions of each of the pair of rails relative to the base;
- at least one adjuster that adjusts the adjusting parts;
- a mirror disc that is mounted on the turntable
- a plurality of mirror plates that are installed on the pair of rails;
- an autocollimator that radiates parallel light beams onto the mirror disc and the plurality of mirror plates;
- a photo detector that detects focused points of the light beams reflected from the mirror disc and the plurality of mirror plates; and
- a controller that determines an amount of tilting from a distance between the focused points.

* * * * *